(12) United States Patent
Kruszynski et al.

(10) Patent No.: US 7,351,017 B2
(45) Date of Patent: Apr. 1, 2008

(54) SOLID DRILL BIT FOR MACHINE TOOLS

(75) Inventors: Jacek Kruszynski, Stuttgart (DE); Alexander Krause, Brackenheim (DE); Henry Schutt, Sechsenheim (DE)

(73) Assignee: KOMET GROUP Holding GmbH, Besigheim (DE)

( * ) Notice: Subject to any disclaimer, the term of this patent is extended or adjusted under 35 U.S.C. 154(b) by 72 days.

(21) Appl. No.: 10/522,647

(22) PCT Filed: Jul. 26, 2003

(86) PCT No.: PCT/EP03/08321

§ 371 (c)(1),
(2), (4) Date: Jan. 26, 2005

(87) PCT Pub. No.: WO2004/014588

PCT Pub. Date: Feb. 19, 2004

(65) Prior Publication Data

US 2005/0260049 A1 Nov. 24, 2005

(30) Foreign Application Priority Data

Aug. 2, 2002 (DE) .............................. 102 35 606

(51) Int. Cl.
*B23B 51/00* (2006.01)
(52) U.S. Cl. ............... 408/223; 408/230; 408/713
(58) Field of Classification Search ............ 408/223, 408/224, 227, 230, 713, 233, 231; 407/113, 407/114, 116
See application file for complete search history.

(56) References Cited

U.S. PATENT DOCUMENTS 3,963,365 A * 6/1976 Shallenberger, Jr. ........ 408/186
4,124,328 A * 11/1978 Hopkins ..................... 408/223
4,131,383 A * 12/1978 Powers ....................... 407/114
4,265,574 A * 5/1981 Eckle .......................... 408/188
4,367,991 A * 1/1983 Grafe et al. ................. 408/224
4,558,975 A * 12/1985 Hale ........................... 408/186
4,563,113 A * 1/1986 Ebenhoch ................... 408/223
4,889,455 A * 12/1989 Karlsson et al. ............ 408/188
5,049,011 A * 9/1991 Bohnet et al. .............. 408/223

(Continued)

FOREIGN PATENT DOCUMENTS

DE 201 18 111 U1 4/2002

(Continued)

*Primary Examiner*—Erica Cadugan
(74) *Attorney, Agent, or Firm*—Flynn, Thiel, Boutell & Tanis, P.C.

(57) ABSTRACT

A solid drill bit for machine tools has a drill bit body and two indexable inserts arranged at a radial distance from one another in respective insert seats. The inserts have an essentially quadratic contour. Their front-end main cutting edges project axially beyond the drill bit body and radially overlap one another. The outer insert has an outer insert corner and a secondary cutting edge perpendicular to the main cutting edge that projects radially beyond the circumference of the drill bit body. To permit burr-free through-drilling, the main cutting edge of the outer insert is subdivided in its longitudinal extent into a radially inner working section and a rectilinear peeling section adjoining the working section and extending to the outer insert corner. The sections enclose a setting angle of 95° to 120°. The peeling section is set at a positive setting angle of 720° to 87°.

13 Claims, 3 Drawing Sheets

U.S. PATENT DOCUMENTS

Figure 1:
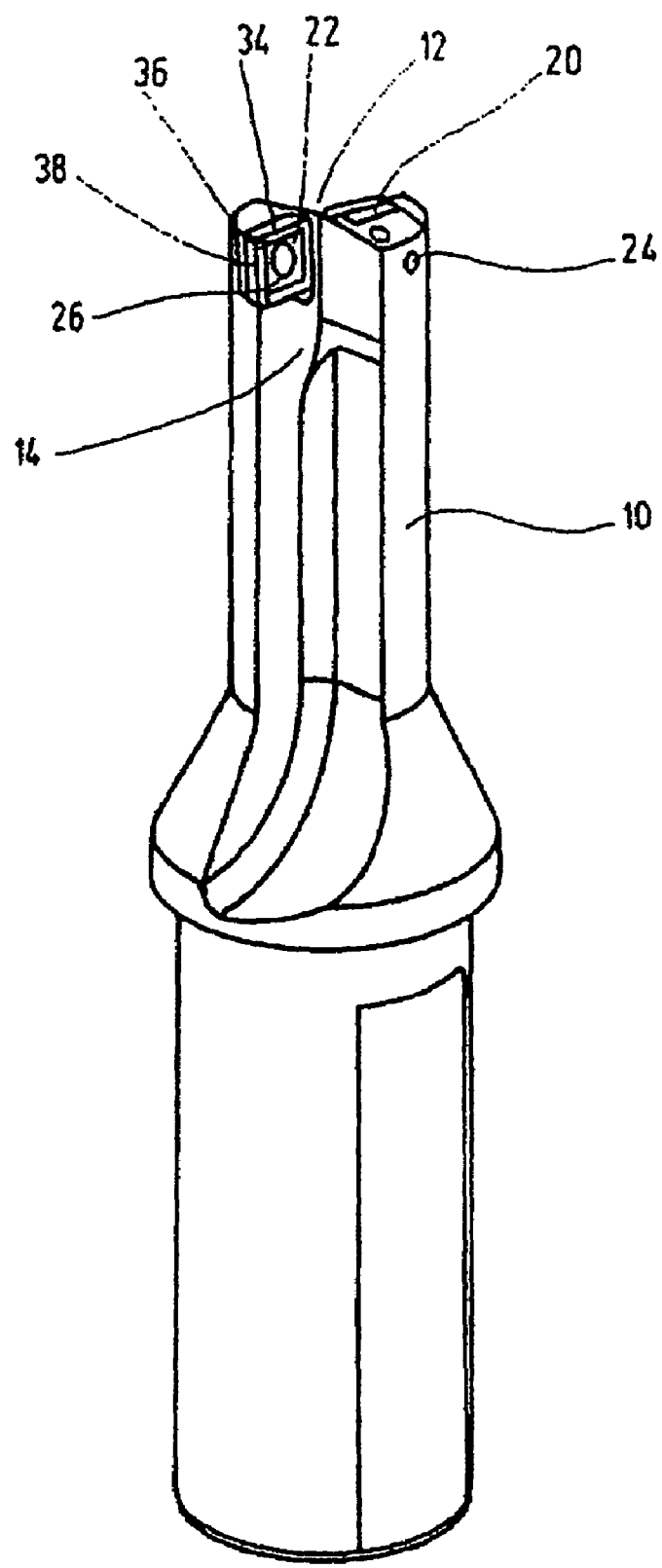

| | | | |
|---|---|---|---|
| 5,302,059 A | * | 4/1994 | Fabiano .................... 408/223 |
| 5,509,761 A | * | 4/1996 | Grossman et al. ............ 408/59 |
| 5,788,431 A | * | 8/1998 | Basteck .................... 408/229 |
| 5,800,100 A | | 9/1998 | Krenzer |
| 5,848,861 A | * | 12/1998 | Hansen .................... 408/143 |
| 5,947,650 A | | 9/1999 | Satran et al. |
| 6,039,515 A | * | 3/2000 | Lamberg .................... 408/188 |
| 6,135,681 A | * | 10/2000 | Nuzzi et al. ................ 408/227 |
| 6,224,300 B1 | * | 5/2001 | Baxivanelis et al. ........ 407/114 |

FOREIGN PATENT DOCUMENTS

| | | |
|---|---|---|
| EP | 0 875 322 A1 | 11/1998 |
| WO | WO 01/85375 A1 | 11/2001 |

\* cited by examiner

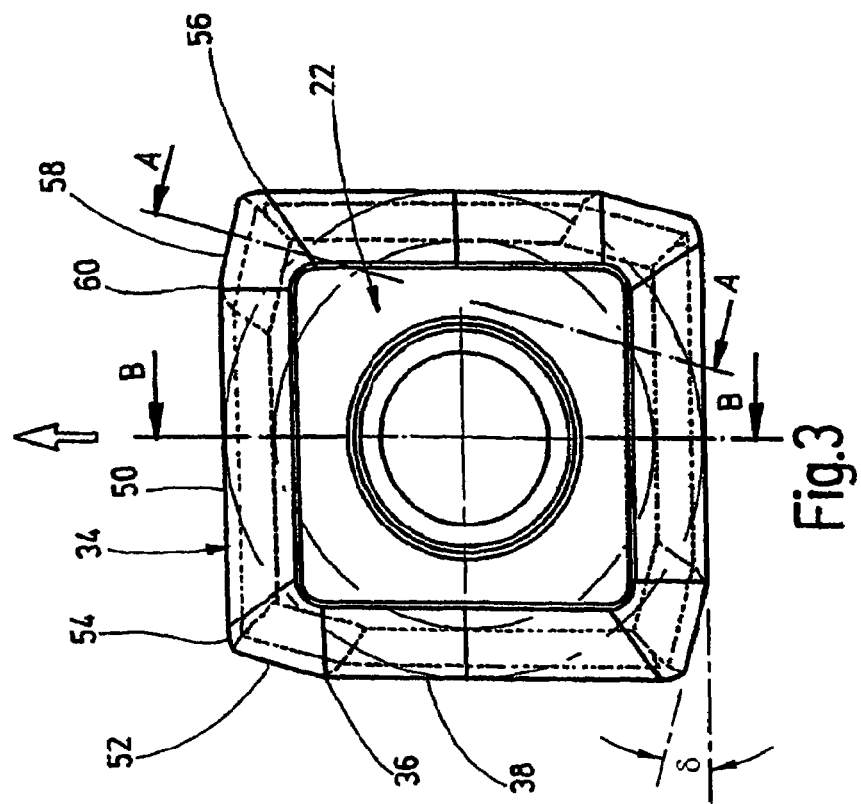
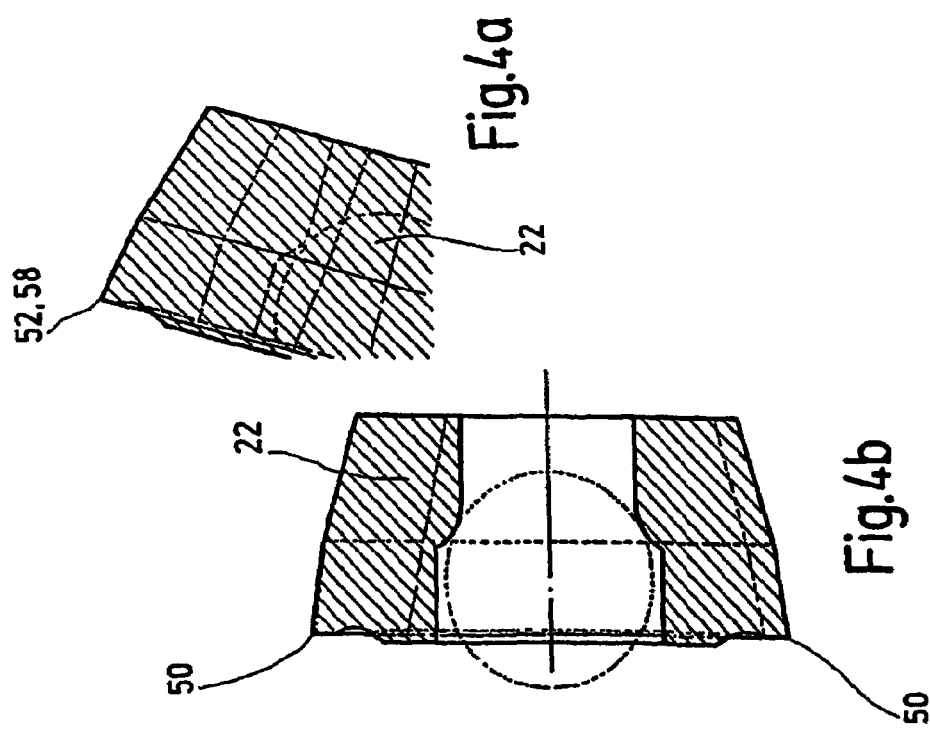

SOLID DRILL BIT FOR MACHINE TOOLS

The invention relates to a solid drill bit for machine tools, having a drill bit body and at least two inserts which are arranged at a radial distance from one another in a respective insert seat of the drill bit body in the region of a chip flute, project with their front-end main cutting edges axially beyond the drill bit body and radially overlap one another in their active regions, the radially outermost insert, with its outer insert corner, which forms a diameter, and its adjoining secondary cutting edge, projecting radially beyond the drill bit body, and the secondary cutting edge, starting from the insert corner, being inclined at a defined setting angle in its longitudinal extent in the direction of the drill bit body.

Drilling tools of this type having two essentially quadratic indexable inserts are known (WO01/85375). The two quadratic inserts are arranged at different radial distances from one another. With their front-end main cutting edges, they project with a positive rake angle axially beyond the drill body. The inner insert has a pre-cutting action in the axial direction, the distance corresponding approximately to the radius of curvature in the region of the insert corners. The inclination of the secondary cutting edge of the outermost insert, at less than 3.2°, is selected in such a way that the secondary cutting edge forms a guide edge which, during the drilling operation, under the effect of a drifting force pointing radially outward, bears in a sliding manner, at least over part of its length, against the wall of the hole produced beforehand. When drilling through workpieces of ductile material using such solid drill bits, it has been found that a projecting burr is formed from the hole in the radius region, this burr often having to be removed subsequently. Burrs also occur during the spot drilling with such a solid drill bit. Tests have shown that, even by using inserts having rounded-off insert corners, a burr formation cannot be avoided.

Based thereon, the object of the invention is to improve the known solid drill bit and its inserts to the effect that burr-free through-drilling is possible even in workpieces of ductile material.

To achieve this object, the feature combinations specified in patent claims 1 and 9 are proposed. Advantageous configurations and developments of the invention follow from the dependent claims.

The solution according to the invention is based on the idea of designing the main cutting edge in such a way that a burr forming in the diameter region of the hole can be cut in the manner of a peeling or reaming operation. In order to achieve this, it is proposed according to the invention that the front-end main cutting edge of the outer insert be subdivided in its longitudinal extent into a radially inner working section and a rectilinear peeling section adjoining said working section on the outside and extending up to the outer insert corner, said sections enclosing an angle of 95° to 120° with one another. The working section leads during the drilling operation, while the peeling section follows up in the diameter region with a steep peeling angle. As a result, the workpiece in the vicinity of the diameter region, depending on the steepness of the setting angle, is divided into more or less fine marginal chips, so that a burr formation is avoided.

A preferred configuration of the invention provides for the working section of the main cutting edge, toward the peeling section, to be set at a positive setting angle of 2° to 10° relative to the imaginary end face, perpendicular to the drill bit axis, of the drill bit body, whereas the peeling section of the main cutting edge, toward the outer insert corner, is set at a positive setting angle of 77° to 87° relative to the end face of the drill bit body. The transition point between working section and peeling section of the main cutting edge may be rounded off convexly. In contrast to that, the outer insert corner should be of relatively sharp-edged design. In the region of the outer insert corner, the peeling section of the main cutting edge and the adjacent secondary cutting edge enclose an angle of 160° to 175° with one another, the secondary cutting edge, in accordance with WO01/85375, being expediently inclined with a setting angle of less than 3.2° in the direction of the drill bit body.

A further advantageous configuration of the invention provides for a central section extending up to the inner insert corner to adjoin the preferably rectilinear working section of the front-end main cutting edge radially on the inside, this central section enclosing a sweepback angle of 160° to 175° with the working section and being set at a negative setting angle of 3° to 18° relative to the end face of the drill bit body. The active region of the central section of the front-end main cutting edge of the outer insert is expediently overlapped by the front-end main cutting edge of the inner insert. This is therefore important because the inserts are preferably designed as indexable inserts having four identical main cutting edges, the central section of a first main cutting edge, during an indexing operation, being turned into the peeling section of an adjacent main cutting edge. It is therefore important that the central section of the outer insert remains free of wear during the drilling operation.

Figure 2C:
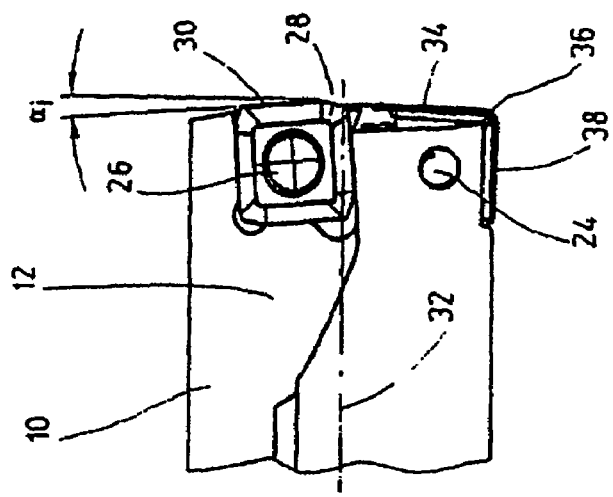
Figure 2A:
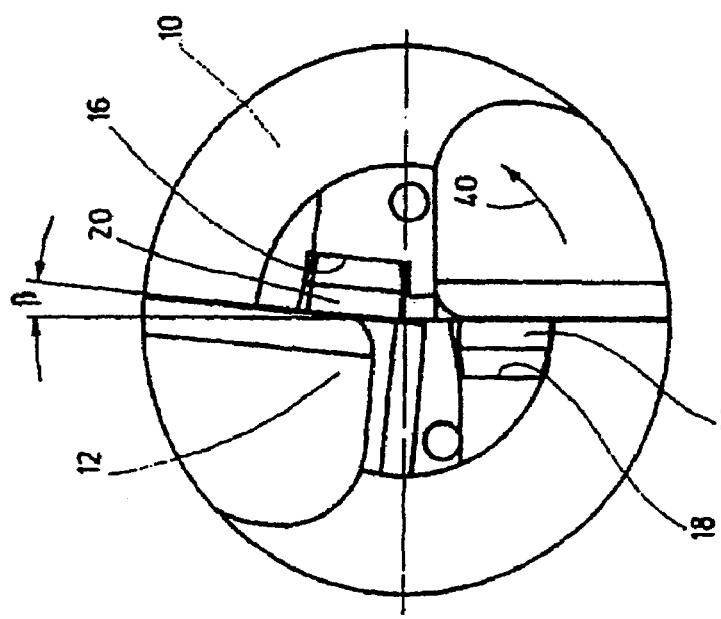
Figure 2B:
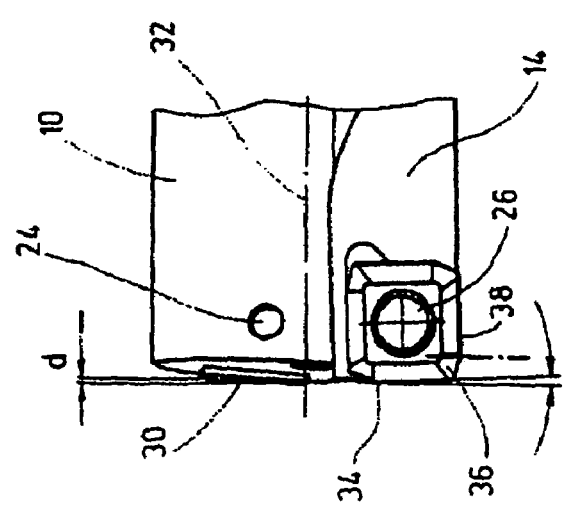

The invention is explained in more detail below with reference to an exemplary embodiment shown schematically in the drawing, in which:

FIG. 1 shows a solid drill bit for machine tools with essentially quadratic indexable inserts in a diagrammatic illustration;

FIGS. 2a to c show a plan view and two cut-away side views of the solid drill bit according to FIG. 1;

FIG. 3 shows a plan view of an indexable insert in an enlarged illustration;

FIGS. 4a and b shows two sectional illustrations along section lines A-A and B-B in FIG. 3.

The tool shown in the drawing is intended as a solid drill bit for machine tools. It has an essentially cylindrical drill bit body 10 which is provided with two chip flutes 12, 14. A respective insert seat 16, 18 for accommodating an essentially quadratic indexable insert 20, 22 is provided at the front end of the chip flutes. The indexable inserts 20, 22 are each fastened to the drill bit body 10 by a countersunk head screw 26 which engages in a tapped hole 24 of the drill bit body 10.

As can be seen from FIGS. 2a to c, the inner indexable insert 22, with the inner insert corner 28 at its front-end main cutting edge 30, overlaps the drill axis 32, whereas the outer indexable insert 22, with its main cutting edge 34 in the region of the outer insert corner 36 and with its outer secondary cutting edge 38, projects beyond the circumference of the drill bit body 10. In addition, the indexable inserts, with their main and secondary cutting edges, are arranged so as to be tilted relative to the drill bit body 10 in such a way that the main cutting edges enclose a positive setting angle $\alpha_i=4°$ and $\alpha_a=2°$, respectively, relative to a plane perpendicular to the drill axis, the indices i and a identifying the inner and outer inserts, respectively. Since the secondary cutting edge 38 is oriented perpendicularly to the adjacent main cutting edge 34, the secondary cutting edge 38, in the exemplary embodiment shown, is inclined, starting from the insert corner 36, in its longitudinal extent in the direction of the drill bit body at a setting angle which corresponds to the angle $\alpha_a$. It can also be seen from FIG. 2a that the main cutting edge 34 of the outer indexable insert 22, in the direction of rotation, indicated by the arrow 40, about the drill axis 32, encloses with the main cutting edge 30 of the inner indexable insert 20 an angle which is smaller than 180° by the angle β. In the exemplary embodiment shown, the angle β is about 5°. Finally, it can be seen from FIG. 2b that the main cutting edge 30 of the inner indexable insert 20 is at a pre-cutting distance d in front of the main cutting edge 34 of the outer indexable insert 22, this distance d being 0.23 mm in the exemplary embodiment shown. The angles $\alpha_i$, $\alpha_a$ and β and the pre-cutting distance d are selected in such a way that the drill, with a defined, radial drifting force, in the region of its outer secondary cutting edge 38, bears in a sliding manner against the wall 42 of the produced hole.

As can be seen in particular from FIG. 3 in conjunction with FIG. 2b, the main cutting edges 34 of the indexable inserts 22 are subdivided in their longitudinal extent into a rectilinear working section 50 and an adjoining, rectilinear peeling section 52 extending up to the first insert corner 36, said sections 50 and 52, in the exemplary embodiment shown, enclosing an angle of 105° with one another in the region of their rounded-off transition point 54. The peeling section 52 of the main cutting edge 34 and the adjacent secondary cutting edge 38 enclose an angle of 165° with one another. Adjoining the rectilinear working section 50 of each main cutting edge 34 is a central section 58 which extends up to the second insert corner 56 and encloses with the working section a sweepback angle 60 of 165°. The central section 58 of a first main cutting edge 34 has the function of a peeling section 52 upon indexing to the next main cutting edge 34.

At the outer insert 22, the subdivision of the main cutting edge 34 into the working section 50 and the peeling section 52 has an important function, which in addition is essential to the invention. This is because it has been found that, during conventional use of a main cutting edge 34 having an insert corner rounded off toward the secondary cutting edge 38 without peeling section 52, an undesirable burr formation occurs, in particular when drilling through ductile workpieces. The burrs must be removed, for example filed off, in an additional operation. The steeply running, rectilinear peeling section 52 according to the invention, adjoining the working section 50 on the outside, ensures that stock is removed from the workpiece in a peeling manner in the diameter region while forming small chips. As a result, a burr formation is effectively avoided. The central section 58, set back at the sweepback angle, of the outer insert 22 is overlapped by the main cutting edge 30 of the leading inner insert 20 during the drilling operation and is thereby rendered ineffective. This is necessary so that the central section 58, which becomes the peeling section 52 when the insert 22 is indexed to the next main cutting edge 34, is not subjected to any wear during the drilling operation.

It is possible in principle to also use the same inserts as inner inserts 20. In this case, dividing of chips, which is advantageous for the drilling operation, occurs in the region of the sweepback angle between working section 50 and central section 58.

In summary, the following can be emphasized: the invention relates to a solid drill bit for machine tools. The solid drill bit has a drill bit body 10 and two indexable inserts 20, 22 arranged at a radial distance from one another in a respective insert seat 16, 18 of the drill bit body 10 in the region of a chip flute 12, 14. The indexable inserts 20, 22 have an essentially quadratic contour. They project with their front-end main cutting edges 30, 34 axially beyond the drill bit body 10 and overlap one another radially in their active region. The radially outer indexable insert 22, with its outer insert corner 36 and with its adjoining secondary cutting edges 38 perpendicular to the relevant main cutting edge 34, projects radially beyond the circumference of the drill bit body. In order to permit burr-free through-drilling, the front-end main cutting edge 34 of the outer insert 22 is subdivided in its longitudinal extent into a radially inner working section 50 and a rectilinear peeling section 52 adjoining said working section 50 on the outside and extending up to the outer insert corner 36, said sections 50 and 52 enclosing a setting angle of 95° to 120°, and preferably 95° to 110°, with one another. Thus, the rectilinear working section 50 and the rectilinear peeling section 52 can enclose a setting angle of 90°+δ, wherein δ is in a range of 5° to 20°. Further, the central section 58 and the rectilinear working section 50 enclose a sweepback angle of 180°−δ, wherein δ is in the range of 5° to 20°. In the fitted state, the peeling section 52, toward the outer insert corner 36, is accordingly set at a positive setting angle of 72° to 87 relative to the end face of the drill bit body.

The invention claimed is:

1. A drilling tool for machine tools, having a drill bit body and at least two inserts which are arranged at a radial distance from one another in insert seats of the drill bit body in a region of respective chip flutes, the inserts project with their front-end main cutting edges axially beyond the drill bit body and radially overlap one another in their active regions, a radially outer insert of said at least two inserts has an outer insert corner and an adjoining secondary cutting edge projecting beyond the drill bit body, and the secondary cutting edge, starting from the insert corner, being inclined at a defined setting angle ($\alpha_a$) in its longitudinal extent in the direction of the drill bit body, wherein the front-end main cutting edge of the outer insert is subdivided in its longitudinal extent into a radially inner working section and a peeling section adjoining said working section on the outside and extending up to the outer insert corner, said working and peeling sections enclosing an angle of 95° to 110° with one another.

2. The drilling tool as claimed in claim 1, wherein the working section of the main cutting edge, toward the peeling section is set at a positive setting angle of 2° to 10° relative to an end face of the drill bit body.

3. The drilling tool as claimed in claim 1, wherein the peeling section of the main cutting edge, toward the outer insert corner, is set at a positive setting angle of 72° to 87° relative to an end face of the drill bit body.

4. The drilling tool as claimed in claim 1, wherein a transition point between the working section and the peeling section of the main cutting edge is rounded off convexly.

5. The drilling tool as claimed in claim 1, wherein in the region of the outer insert corner, the peeling section of the main cutting edge and the adjacent secondary cutting edge enclose an angle of 160° to 175° with one another.

6. The drilling tool as claimed in claim 1, wherein a central section extending up to an inner insert corner adjoins the working section of the front-end main cutting edge radially on the inside, the central section enclosing a sweepback angle of 160° to 175° with the working section and being set at a negative setting angle of 3° to 18° relative to the end face of the drill bit body.

7. The solid drill bit as claimed in claim 6, wherein the active region of the central section of the front-end main cutting edge of the outer insert is overlapped by the front-end main cutting edge of the inner insert and is rendered ineffective.

8. The solid drill as claimed in claim 1, wherein the inserts comprise indexable inserts having four main cutting edges of the same length.

9. A drilling tool for machine tools comprising:
a drill bit body having at least two insert seats and chip flutes opening axially at an end face thereof;
an inner insert mounted in one of said insert seats and having a front-end main cutting edge projecting axially beyond the end face of the drill bit body; and
a radially outer insert mounted in another one of said insert seats and having a front-end main cutting edge projecting axially beyond the end face of the drill bit body and an adjoining secondary cutting edge projecting radially outwardly beyond the drill bit body, the front-end main cutting edge and the secondary cutting edge meeting at an outer insert corner of said outer insert, the secondary cutting edge starting from the insert corner being inclined at a defined setting angle ($\alpha_a$) along the length thereof, and to permit burr-free through drilling the front-end main cutting edge of the outer insert is subdivided along the length thereof into a radially inner working section and a peeling section, the peeling section adjoining the working section and extending radially outwardly to the outer insert corner, wherein the inner working section and the peeling section enclose an angle of 95 degrees to 110 degrees.

10. The drilling tool of claim 9, wherein the working section of the main cutting edge toward the peeling section is set at a positive setting angle of 2 degrees to 10 degrees relative to the end face of the drill bit body.

11. The drilling tool of claim 9, wherein the peeling section toward the outer insert corner is set at a positive setting angle of 72 degrees to 87 degrees relative to the end face of the drill bit body.

12. The drilling tool of claim 9, wherein a transition point between the working section and the peeling section of the outer insert is rounded off convexly.

13. The drilling tool of claim 9, the outer insert including a central section adjoining the working section and extending radially inwardly to an inner insert corner, the central section enclosing a sweepback angle of 160 degrees to 175 degrees with the working section and being set at a negative setting angle of 3 degrees to 18 degrees relative to the end face of the drill bit body.

* * * * *